United States Patent [19]

Young

[11] 3,808,377

[45] Apr. 30, 1974

[54] REMOTE SENSING CIRCUIT

[75] Inventor: John S. Young, Addison, Ill.

[73] Assignee: GTE Automatic Electric Laboratories Incorporated, Northlake, Ill.

[22] Filed: Sept. 15, 1972

[21] Appl. No.: 289,399

[52] U.S. Cl. .......... 179/18 FA
[51] Int. Cl. .......... H04q 3/18
[58] Field of Search .......... 179/18 FA

[56] References Cited

FOREIGN PATENTS OR APPLICATIONS 466,379 1/1969 Switzerland .......... 179/18 FA

*Primary Examiner*—William C. Cooper
*Attorney, Agent, or Firm*—L. N. Arnold

[57] ABSTRACT

An electronic sensing circuit for use with a balanced two-wire load including a pair of voltage divider networks connected thereto, respectively. The midpoint nodes of the voltage divider network have substantially equal voltage levels in one state of said load and have a voltage differential measurable therebetween in another state of said load. A voltage differential detector means such as a capacitor or differential amplifier is used to measure the voltage differential between the midpoint nodes.

10 Claims, 4 Drawing Figures

PATENTED APR 30 1974

3,808,377

REMOTE SENSING CIRCUIT

BACKGROUND OF THE INVENTION

This invention relates generally to electronic sensing circuits, and more particularly, relates to a sensing circuit arrangement for monitoring the status of a remote contact in a telephone communication system.

It is becoming increasingly popular to monitor the states of electrical circuits or contacts through the use of electrical or electronic sensing circuits such as through the use of secondary electromagnetic sensing coils as disclosed in U.S. letters Patent Nos. 3,571,800 and 3,626,248, through the use of transistor devices selectively rendered conductive or non-conductive as disclosed in U.S. patent application Ser. No. 158,009, filed June 29, 1971, and through the use of voltage divider circuits combined with diode devices as disclosed in U.S. patent application Ser. No. 158,008, filed June 29, 1971, these latter two patent applications being assigned to the assignee of the present invention. It is common practice to monitor the on-hook, off-hook, call-for-service status of subscriber loop circuits primarily by means of double wound line relays located in the central office and capable of presenting a balanced impedance condition to the subscriber loop circuit. The present invention is particularly advantageous in monitoring such subscriber loop circuits and is adaptable for being arranged in matrix groupings of such sensing circuits similar to the 32×32 matrix of the above-referenced U.S. application Ser. No. 158,008. For remote contact monitoring of the subscriber station apparatus, the monitoring central office equipment is normally separated from the station apparatus by a span of telephone cable which may extend for a number of miles. Impedance imbalances and mismatches which exist along this span can cause undesirable longitudinal currents to exist along such span, which longitudinal currents have adverse interfering affects on adjacent twisted pair cable lines. The sensing circuit of the present invention is designed to monitor the on-hook, off-hook state of the subscriber station apparatus without being adversely affected by impedance imbalances while the sensing circuit of U.S. application 158,008 is of primary use in monitoring a remote contact within a terminal office such as a central office. Additionally, the present sensing circuit offers a cost savings over the utilization of the rather expensive double wound line relays.

SUMMARY

It is among the objects of the present invention to provide a new and novel solid state electronic sensing circuit for monitoring the state of remote, relatively long distance electrical circuits or devices; to provide for use with a subscriber loop circuit a sensing circuit capable of providing a voltage differential across the tip and ring wires when the subscriber station apparatus is in the off-hook state; to provide a capacitor to be used as a differential voltage detecting means for detecting the voltage difference occurring in the off-hook state; to provide a sensing circuit which will essentially ignore the presence of longitudinal currents and impedance imbalances; and to provide a plurality of such sensing circuits permitting a realized economy over the multiple use of double wound electro-mechanical line relays.

In a preferred practice of the invention the tip and ring wires of a 2-wire subscriber loop circuit are terminated to ground potential through a first resistor element and to negative supply battery through a second resistor element, respectively. A first voltage divider network having a pair of resistor elements connected in electrical series has one circuit end thereof connected to the subscriber side of the first resistor element and the other and opposite end thereof connected to negative supply battery. A second voltage divider network having a pair of resistor elements connected in electrical series has one circuit end thereof connected to the subscriber side of the second resistor element and the other and opposite circuit end thereof connected to ground potential. The ohmic values of the resistor elements of the first and second voltage divider networks are substantially equal and are very large with respect to the ohmic values of said first and second resistor elements. The midpoints of the first and second voltage divider networks are interconnected through a differential voltage detecting means such as a capacitor device. Interrogating signals are connected to the midpoint of the second voltage divider network through first rectifying means in the form of a diode having its anode terminal connected to the midpoint node of the voltage divider. The differential voltage between the midpoint nodes of the two voltage divider networks is coupled to output signal source means through a second rectifying means in the form of a diode having its cathode connected to the midpoint node of the first voltage divider network.

Other objects and advantages of the invention will naturally occur to those skilled in the pertinent art as the invention is described in connection with the accompanying drawing in which:

THE DRAWING

DETAILED DESCRIPTION

Figure 1:
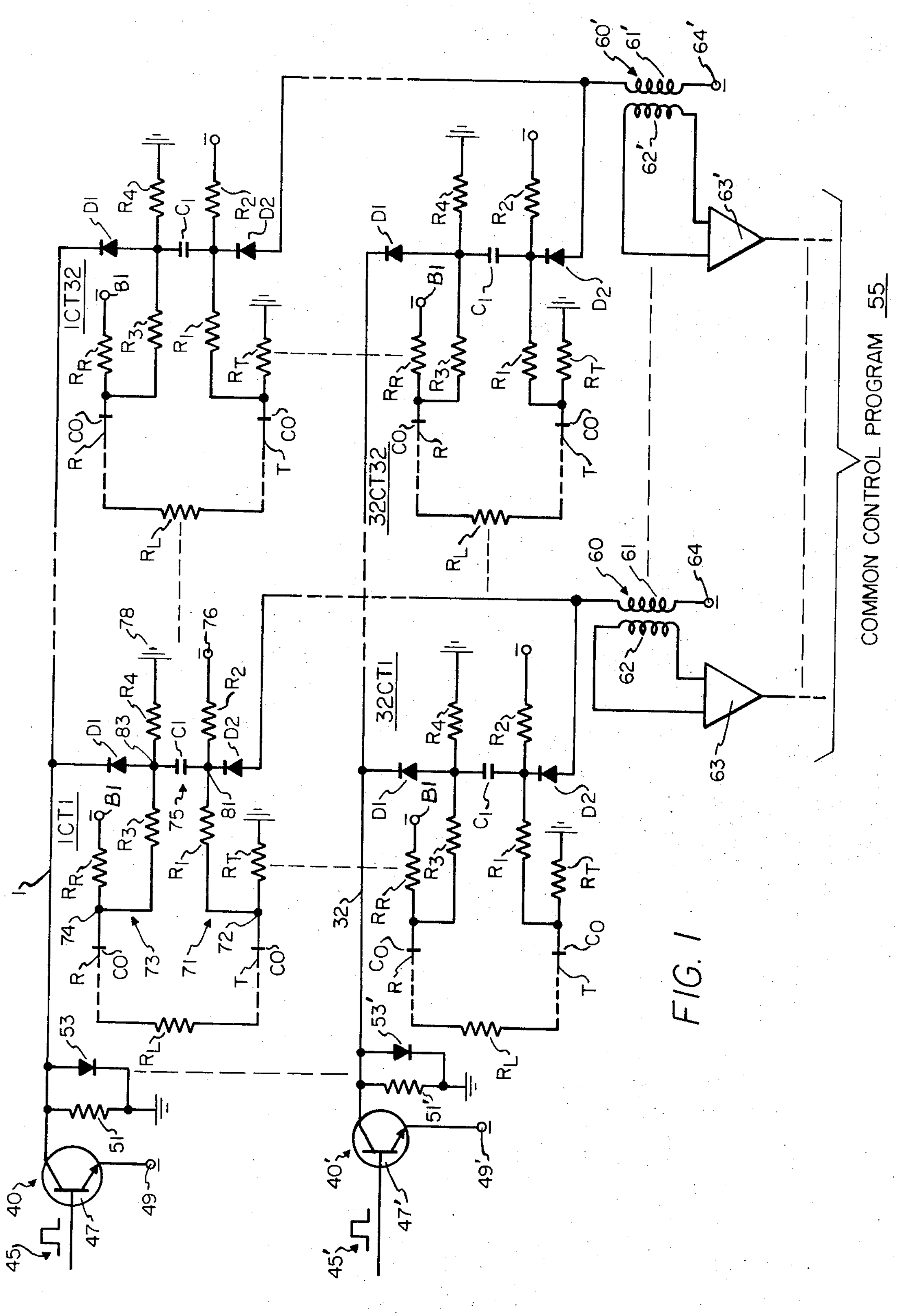
FIG. 1 is a schematic representation of a large matrix arrangement of electronic sensing circuits made in accordance with the principles of the present invention.

There is illustrated in FIG. 1 a 32 by 32 matrix of electronic sensing circuits arranged in horizontal rows and vertical columns, as indicated by rows of sensing circuits 1CT1 through 1CT32 and 32CT1 through 32CT32 and by columns of sensing circuits 1CT1 through 32CT1 and 1CT32 through 32CT32, respectively. Each row of sensing circuits is coupled to a common signal line such as line 1 for horizontal row 1CT1 through 1CT32 and line 32 for horizontal row 32CT1 through 32CT32. Each sensing circuit is shown coupled to a tip and ring 2-wire subscriber loop circuit represented by the loop comprised of resistor elements $R_R$, $R_L$ and $R_T$ representing a resistor in the ring wire of the 2-wire subscriber loop, an equivalent line loop resistance, and a resistor in the tip wire of the 2-wire subscriber loop, respectively. There is also shown at CO in the tip and ring wires the break contacts of a cut-off relay (not shown) which is effective to disconnect the subscriber loop circuit from its associated sensing circuit once a call-for-service has been sensed and appropriate dial pulse receiving equipment such as a register-sender unit is to be connected to the subscriber loop. The ring wire R is coupled to a negative supply battery B1 such as a negative 48 volt exchange battery and the tip wire is terminated to ground potential. The resistors $R_R$ and $R_T$ are of substantially equal ohmic value for providing balanced impedances for the associated 2-wire subscriber loop circuits as would be provided by the balanced impedance coils of a double wound line relay commonly used.

Now in accordance with the monitoring scheme of the matrix arrangement of FIG. 1, each sensing circuit is coupled through a rectifying means such as the associated diode D1 to the incoming signal line which is in turn connected to input signal source means 40 for input line 1 and 40' for input line 32. The input source means 40, 40' comprises a normally non-conducting NPN transistor 47, 47' having its emitter terminal connected to a negative supply battery at 49, 49'. The transistor 47, 47' is turned on by an enabling pulse 45, 45' and connects the negative battery 49, 49' to each of the sensing circuits in the associated horizontal row of sensing circuits and to ground potential through a collector load resistor 51, 51'. A reverse bias protection diode 53, 53' is provided for the transistor 47, 47' by coupling the diode 53, 53' from the collector of the transistor 47, 47' to ground potential. The input source means 40, 40' constitutes means of interrogating a plurality of sensing circuits for determining the on-hook (open loop) and off-hook (closed loop) states of the standard subscriber station apparatus on subscriber loop circuits. When an off-hook state has occurred in one or more of the subscriber loop circuits being monitored, the associated sensing circuit as described hereinafter will upon the next occurrence of the periodically supplied enabling pulse 45, 45' cause an output signal to be supplied to a common control program 55 which then can cause the cut-off relay to operate, disconnecting the associated sensing circuit and connecting a register-sender unit to the subscriber loop circuit.

The output signal is derived through the output signal source means or output pulse detecting means such as 60 for vertical column 1CT1 through 32CT1 and 60' for vertical column 1CT32 through 32CT32. The output signal source means 60, 60' are identical and each thereof comprise a first or primary coil 61, 61' inductively coupled to a second or secondary coil 62, 62' in turn coupled to a power amplifier 63, 63'. The output signal of the power amplifier 63, 63' is supplied to the common control program 65 the details of which are not shown. The primary coil 61, 61' is terminated to a negative supply battery 64, 64'.

Each combination of a subscriber loop circuit and its associated sensing circuit in the 32 × 32 matrix of sensing circuits is redundant to the other such combinations; hence, it is convenient to utilize the same reference characters or numerals to identify common elements thereof. Accordingly, only the sensing circuit 1CT1 will be described in detail. The sensing circuit 1CT1 thus is basically comprised of first and and second voltage divider networks 71 and 73 connected to the tip T and ring R conductors at electrical nodes 72 and 74, respectively, and differential voltage detecting means 75. The first voltage divider network 71 is comprised of a pair of series connected resistor elements R1 and R2 having one circuit end thereof connected to the subscriber side of the tip resistor $R_T$, the other and opposite circuit end thereof connected to negative supply battery at 76 and the midpoint connection at 81 connected to the output signal source means 60 through a rectifying means such as the output diode D2 having its cathode terminal connected to the midpoint connection 81. The second voltage divider network 73 is comprised of another pair of series connected resistor elements R3 and R4 having one circuit end thereof connected to the subscriber side of the ring resistor $R_R$, the other and opposite circuit end thereof connected to ground potential at 78 and the midpoint connection at 83 connected to the anode terminal of the previously mentioned input diode D1. The differential voltage detecting means 75 comprises a capacitor device C1 interconnected between the midpoint connections 81 and 83 of the first and second voltage divider networks 71 and 73, respectively. Preferably, the resistor elements R1, R2, R3 and R4 are provided of substantially equal ohmic value and are relatively large with respect to the ohmic values of the tip and ring resistors $R_T$ and $R_R$ in order to minimize the loading effect of the voltage divider networks 71 and 73 on the associated subscriber loop circuit.

OPERATION OF THE SENSING CIRCUIT

The operation of the sensing circuit such as 1CT1 is best understood from a consideration of the following circuit analysis, to wit: with the ohmic values of the voltage divider resistors being large with respect to the balanced line resistors $R_R$ and $R_T$, the voltages at points 72 and 74 can be represented by the formulas A and B, respectively, $$E_{72} = E_B \cdot R_T / 2R_T + R_L, \tag{A}$$

and $$E_{74} = E_B \cdot \overline{R_L + R_R / 2R_R + R_L}, \tag{B}$$

where $E_B$ is the exchange battery. The voltage at the midpoint 81 of the first voltage divider network 71 is represented by formula C, namely $$\overline{E_{81} = E_B R1 + E_{72} R2 / R1 + R2}, \tag{C}$$

and the voltage at the midpoint connection 83 is at a voltage $E_{83}$ between the voltage $E_{74}$ and ground potential and represented by formula D, namely $$\overline{E_{83} = E_{74} R4 / R3 + R4.} \tag{D}$$

The differential voltage $E_D$ existing between the midpoint connections 81 and 83 is represented by formula E, where $$E_D = E_{81} - E_{83}, \text{ or} \tag{E}$$

$$E_D = E_B R1/R1 + R2 + E_{72} R2/R1 + R2 - E_{74} R4/R3 + R. \quad (E)$$

Now if a power line disturbance or a coin station ground connection presents a balanced longitudinal voltage to the central office equipment, there is an incremental change in voltage $E_{\Delta D}$ developed across the tip and ring resistors $R_T$ and $R_R$. The differential voltage $E_D$ is now represented by $$E_D = E_B R1/R1 + R2 + (E_{72} + E_{\Delta D} R2/R1 + R2 - (E_{74} + E_{\Delta D}) R4/R3 + R4$$

and where the term $R2/R1 + R2$ is equal to the term $R4/R3 + R4$, it is apparent the incremental voltage $E_{\Delta D}$ does not modify $E_D$. Therefore, the configuration of the sensing circuit 1CT1 when used with the balanced impedance loading provides a common mode spurious signal rejection.

Figure 2:
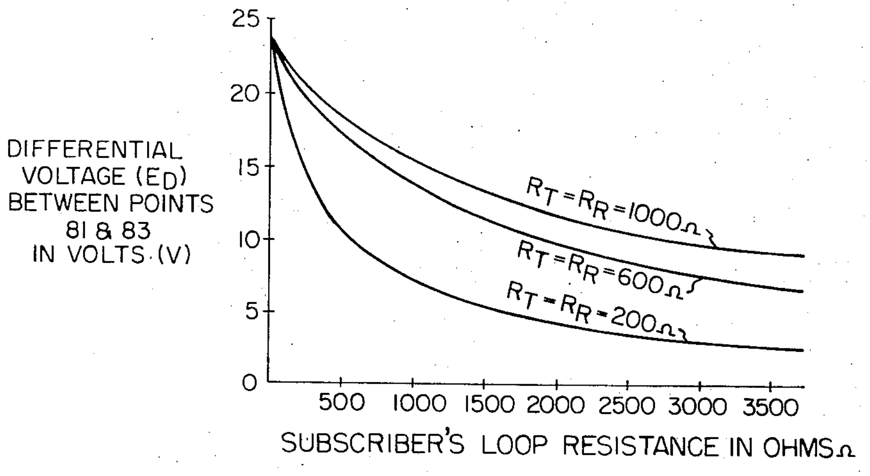
FIG. 2 is a graphical representation of the variation of a voltage differential measured by the electronic sensing circuits with different values for the equivalent resistance of a subscriber loop circuit.

FIG. 2 shows a family of curves corresponding to different values of ring and tip resistors $R_R$ and $R_T$ where the exchange battery $E_B$ is equal to a negative 48 volts, and showing the variation of the differential voltage $E_D$ over a range of subscriber loop resistance values of zero to some 3,500 ohms. The capacitor C1 will charge to the value of $E_D$ and when the transistor 47 is conducting, the input diode D1 is forward biased and the output diode D2 is forward biased, the primary coil 61 will receive a pulse which results in an output signal to the common control program 55.

As an example of a representative sensing circuit arrangement, let $R_R$ and $R_T$ equal to 600 ohms and R1, R2, R3 and R4 each equal to one megohm and the capacitor C1 be approximately 0.01 microfarads. The charge circuit of the capacitor C1 will have an RC time constant in the range of tens of milliseconds and there will be provided considerable isolation between the drive electronics and possible voltage surges and transients on the associated subscriber line. Now using formulas A and B, the voltages at points 72 and 74 are both substantially a negative 24 volts where the equivalent loop resistance is zero (closed loop), and the voltages at points 81 and 83 are approximately equal to negative 36 volts and negative 12 volts, respectively, as given by formulas C and D. The differential voltage is approximately 24 volts in magnitude. When the equivalent loop resistance $R_L$ is approximately 3,000 ohms, the voltages at the midpoints 81 and 83 are seen to be approximately negative 27.5 volts and 20.5 volts, respectively, and the differential voltage $E_D$ is some 7 volts in magnitude. With the transistor 47 in a nonconducting state, the diodes D1 and D2 are reverse biased and no output signal is obtained, but with the transistor 47 conducting, the voltage at point 83 is pulled down sharply to essentially a negative 48 volts and since the voltage at point 81 is more negative by at least 7 volts or 24 volts, the diodes D1 and D2 are forward biased and the differential voltage is applied across the primary coil 61. Longitudinal or common mode voltages on the subscriber line cause the voltages at points 81 and 83 to vary but since the degree of variation is the same for both electrical points, the net effect is that the voltage across the capacitor C1 remains unchanged. The pulse time is relatively short so that the charge on the capacitor C1 is not significantly modified by the discharge current through the primary coil 61. The sensing circuit 1CT1 is thus seen to respond in a positive manner (signal output to the common control program) to an off-hook status of the subscriber station apparatus.

When the station apparatus is in the on-hook state and the transistor 47 is non-conducting, the voltages at the midpoints 81 and 83 are both approximately a negative 24 volts; hence no differential voltage $E_D$. With the transistor 47 switched on, the voltages at points 81 and 83 swing to a negative 48 volts but still there is no differential voltage $E_D$.

Figure 3:
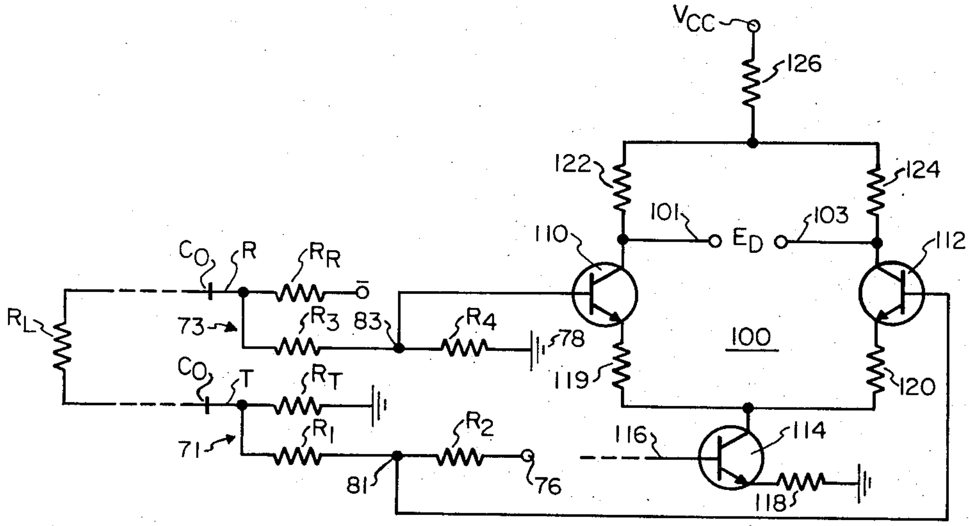
FIG. 3 is a schematic diagram of an alternative electronic sensing circuit employing another voltage differential detecting means.

FIG. 3 shows an alternative embodiment of the sensing circuits of FIG. 1 wherein the differential voltage detecting means comprises a constant current source differential amplifier circuit 100 substituted for the capacitor C1. The output of the differential amplifier circuit 100 is taken between points 101 and 103 of FIG. 3. In its operation, the differential amplifier circuit 100 gives the same results as does the capacitor C1. The base drive voltages to NPN transistors 110 and 112 vary with the voltages at the midpoint connections 81 and 83. When there is a difference in these midpoint voltages, the difference is reflected at the output terminals 101 and 103 of the differential amplifier 100. The differential amplifier circuit 100 is operated with its NPN drive transistor 114 operated as a constant current source with its base drive being supplied at 116 from circuitry not shown but which is well known in the art. Emitter resistors 118, 119 and 120, collector resistors 122 and 124 and load resistor 126 connected to a power supply Vcc are also standard and are not thought to require further explanation.

Figure 4:
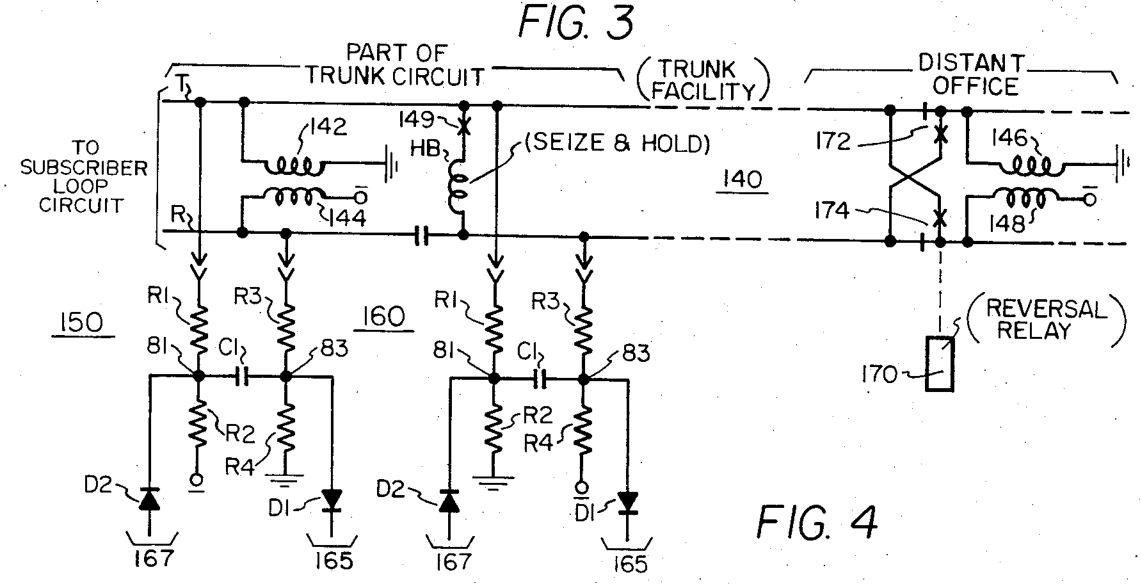
FIG. 4 is a schematic diagram of an alternative application for the electronic sensing circuits of FIG. 1.

There is shown in FIG. 4 an outgoing loop trunk facility 140 which may also be monitored by sensing circuits similar to the sensing circuit 1CT1 of FIG. 1. In accordance with a standard configuration for such trunk facilities, a local battery feed includes two balanced windings 142 and 144 and monitors the subscriber loop circuit while another local battery feed includes two balanced windings 146 and 148 and supervises the distant office. A holding bridge HB provides means to seize and hold the trunk facility 140 for use in routing a selected call following closure of the associated contacts 149. A pair of sensing circuits 150 and 160 are shown connected across the tip T and ring R conductors of the trunk facility 140 on opposite sides of the holding bridge HB. The sensing circuit 150 is provided for monitoring the associated subscriber loop circuit and a sensing circuit 160 is provided for monitoring the trunk facility 140 through monitoring the status of the holding bridge HB. Similar reference characters and numerals as used to describe the sensing circuit 1CT1 are applied to the sensing circuits 150 and 160 without further explanation in order to provide brevity wherein it is convenient to do so. The input diodes D1 connect at 165 to a common input interrogation source such as the input signal source means 40, 40′ of FIG. 1. The output diodes D2 connect at 167 to a common output signal source means such as 60, 60′ of FIG. 1. A reversal relay 170 is provided at the distant end of the trunk facility 140 and includes make contacts 172 and 174 for reversing polarity in order to retain the same polarity of sensing to the sensing circuits 150 and 160 during both on-hook and off-hook conditions. It is apparent that the individual trunk facility 140 with its sensing circuits 150 and 160 of FIG. 4 can be arrayed in a multiple matrix similar to the 32 by 32 matrix of FIG. 1.

Other balanced 2-wire circuits having two different states which could be recognized by the sensing circuit as disclosed in the present invention could also be monitored such as junctors. While the present invention has been shown and described with reference to the preferred embodiments thereof, it is to be understood that the invention is not limited to the precise form set forth herein and that various modifications and changes may be made therein without departing from the spirit and scope of the present invention.

What is claimed is:

1. An electronic sensing circuit for use with a telephone communication circuit of the two-wire configuration and including off-hook and on-hook conditions, comprising: a first voltage divider network including a pair of series connected resistor elements having a midpoint connection there-between and having one circuit end thereof connected to a first wire of said two-wire communication circuit and the other circuit end thereof connected to a voltage supply source, a second voltage divider network including another pair of series connected resistor elements having a midpoint connection therebetween and having one circuit end thereof connected to a second wire of said two-wire communication circuit and the other circuit end thereof connected to said ground potential, said midpoint connections being at the same voltage potential with said communication circuit in said on-hook condition and having a difference of voltage potential there-between with said communication circuit in said off-hook condition, means for selectively interrogating said sensing circuit to determine the presence of said voltage difference, said interrogating means connected to the midpoint connection for said first voltage divider network, and differential voltage detecting means connected between said midpoint connections for detecting said voltage difference occurring with said off-hook condition of said communication circuit and providing an output signal representative thereof when said interrogating means interrogates said sensing circuit.

2. The electronic sensing circuit of claim 1 wherein first rectifying means are connected to said midpoint connection for said second voltage divider network and second rectifying means are connected to the midpoint connection for said first voltage divider network, said first and second rectifying means being reversed biased and non-conducting with said communication circuit in its off-hook condition and said interrogating means being inactive.

3. The electronic sensing circuit of claim 2 wherein said first and second recitfying means are forward biased with said communication circuit in its off-hook condition and said interrogating means being active.

4. The electronic sensing circuit of claim 3 wherein said first rectifying means comprises a diode having its anode connected to its associated midpoint connection and said second rectifying means comprises a diode having its cathode connected to its associated midpoint connection.

5. The electronic sensing circuit of claim 1 wherein the differential voltage detecting means comprises a capacitor device.

6. The electronic sensing circuit of claim 1 wherein said differential voltage detecting means comprises a differential amplifier circuit.

7. The electronic sensing circuit of claim 1 wherein the two-wire communication circuit presents a balanced impedance to said first and second voltage divider networks.

8. A sensing circuit arrangement for use with a balanced impedance two-wire communication circuit having both off-hook and on-hook electrical conditions comprising: first and second voltage divider circuits, each having a pair of series connected resistors and a midpoint connection therebetween, said first divider circuit having one circuit end thereof connected to one of said two wires and the opposite circuit end thereof connected to a voltage supply source, and said second divider circuit having one circuit end thereof connected to the other of said two wires and the opposite circuit end thereof connected to ground potential, said midpoint connections being at the same voltage potential with said communication circuit in said on-hook condition and having a difference of voltage potential therebetween with said communication circuit in said off-hook condition, differential voltage detecting means connected between said midpoint connections for detecting said voltage difference, means for sensing said voltage difference and providing an output signal representative thereof, and means for selectively interrogating said sensing circuit to detect the presence of said voltage difference and being connected to the midpoint connection for said first voltage divider network, first and second rectifying means connected to said midpoint connections for said second and first voltage divider networks, respectively, both thereof being reverse biased with said communication circuit in its off-hook condition and said interrogating means being inactive.

9. The electronic sensing circuit of claim 8 wherein the differential voltage detecting means comprises a capacitor device.

10. The electronic sensing circuit of claim 8 wherein said differential voltage detecting means comprises a differential amplifier circuit.

* * * * *